United States Patent [19]

Lehmann

[11] Patent Number: 5,029,464
[45] Date of Patent: Jul. 9, 1991

[54] METHOD AND APPARATUS FOR LEAK TESTING A HOLLOW BODY

[76] Inventor: Martin Lehmann, Obere Farnbühlstrasse 1, 5610 Wohlen, Switzerland

[21] Appl. No.: 599,424

[22] Filed: Oct. 18, 1990

Related U.S. Application Data

[63] Continuation of Ser. No. 474,164, Feb. 2, 1990, which is a continuation of Ser. No. 115,408, Nov. 2, 1987.

[51] Int. Cl.$^5$ .............................................. G01M 3/36
[52] U.S. Cl. ........................................ 73/49.3; 73/52
[58] Field of Search .................. 73/49.3, 49.2, 52, 37

[56] References Cited

U.S. PATENT DOCUMENTS

| | | | |
|---|---|---|---|
| 2,784,373 | 3/1957 | Lawrance et al. ............... | 73/49.3 X |
| 4,478,070 | 10/1984 | Clifford et al. ...................... | 73/49.3 |
| 4,656,866 | 4/1987 | Aarts ..................................... | 73/49.3 |
| 4,709,578 | 12/1987 | Iwasaki et al. ...................... | 73/49.3 |

FOREIGN PATENT DOCUMENTS

| | | | |
|---|---|---|---|
| 69569 | 9/1987 | Australia . | |
| 0238861 | 9/1987 | European Pat. Off. . | |
| 232550 | 1/1986 | German Democratic Rep. ..................................... | 73/49.3 |
| 34337 | 2/1983 | Japan ..................................... | 73/49.3 |
| 38338 | 2/1987 | Japan ..................................... | 73/49.3 |
| 38339 | 2/1987 | Japan ..................................... | 73/49.3 |
| 795538 | 1/1981 | U.S.S.R. ............................... | 73/49.2 |

Primary Examiner—Hezron E. Williams
Assistant Examiner—Joseph W. Roskos
Attorney, Agent, or Firm—Antonelli, Terry, Stout & Kraus

[57] ABSTRACT

A method and apparatus for leak testing a hollow body wherein the hollow body is placed in a test chamber. A prechamber is brought to a desired pressure, then connected with the test chamber. The pressure in the test chamber is stored at a certain point in time on an input side of a differential pressure sensor and then the course of the test chamber pressure is compared with reference pressure thus formed. Any pressure compensation which occurs if leaks are present in the hollow body is recorded as an indication of such leakage.

19 Claims, 3 Drawing Sheets

METHOD AND APPARATUS FOR LEAK TESTING A HOLLOW BODY

This is a continuation of Ser. No. 474,164, filed Feb. 2, 1990, which is a continuation of Ser. No. 115,408, filed Nov. 2, 1987, both now abandoned.

BACKGROUND OF THE INVENTION

The present invention relates to a method and apparatus for testing tightness of at least one hollow body and for detecting a change in volume caused by pressure stress applied to walls of the hollow body such as, for example, a flexible hollow body such as a coffee package.

In the packaging of certain foodstuffs such as sweeteners and coffee or also medications such as, for example, effervescent tablets, it is essential that the packaging containers are sealed tight against the environment in order to prevent the packaged goods from becoming contaminated by, for example, atmospheric humidity. The goods are sometimes packed in containers such as cans or pouches. These containers are generally dimensionally stable or flexible hollow bodies which are fitted with lids or closable sections which can be opened, but which in the closed state are intended to tightly seal the interior of the hollow body.

Various procedures, for example, welding, are used in the manufacture of such containers. In addition to the tightness of such hollow bodies, also the rigidity of the walls of the dimensionally stable containers, especially in the area of junction points, is an essential criteriion determining their useability. Excessively rigid or excessively weak sections such as weld seams, may result in cracks forming when the container is in use, for example, in areas where parts of different rigidity are joined.

SUMMARY OF THE INVENTION

One object of the present invention is to create a testing method for such hollow bodies as well as a corresponding apparatus for testing such hollow bodies in a simple and greatly reliable manner.

In particular, the present invention proposes a method wherein the hollow body is placed in a test chamber and is subjected to a positive or negative pressure difference between the internal pressure of the hollow body and the pressure in the test chamber, whereby conclusions can be drawn regarding the tightness of the hollow body or its change in volume from the behavior of the pressure in the test chamber.

When such a hollow body, which is optionally and preferably filled, it introduced into a test chamber and the chamber is filled with a test gas, preferably air, having a positive or negative differential pressure relative to the internal pressure of the hollow body, a pressure equalization will take place between the test chamber pressure and the internal pressure of the hollow body depending on the tightness or leakage of the hollow body. The rate at which this equalization process takes place is a measure of the magnitude of any leakage that is present. Similarly, any increase or decrease in a volume of the hollow body will exert an effect which is a measure of the elasticity of the walls of the hollow body. The volume will increase when the pressure difference is directed outwards from the hollow body and it will decrease when the pressure difference is directed from the test chamber towards the interior of the hollow body.

According to one embodiment of the present invention, the pressure in the test chamber is preferably constantly regulated according to a given time sequence and the controlled variable used is evaluated. If a leak exists in the hollow body undergoing testing, then in order to maintain a constant pressure in the test chamber, a certain amount of pressure medium as a controlled variable must be added to or removed from the chamber per unit of time. This amount corresponds to the per unit time amount of pressure medium flowing from the chamber into the interior of the hollow body or vice versa. The amount of pressure medium per unit time which has to be supplied to or, when the pressure difference is directed outwards from the interior of the hollow body, must be removed from the test chamber is preferably evaluated as a measured variable.

To apply a predetermined pressure, practically as the initial pressure to the test chamber and, after sealing off the pressurized chamber containing the hollow body, in order to derive the above mentioned criteria from the pressure curve, a second chamber may be pressurized to a given pressure and joined to the test chamber in order to produce the differential pressure. The pressure in the test chamber, once the two chambers are joined, is derived from the pressure level set in the further chamber and the volume ratio of the two chambers. In order to increase a measurement signal, the test chamber should preferentially be prepressurized with a positive or negative pressure relative to the atmospheric pressure.

Further, to create a defined reference pressure for the purpose of evaluating the internal pressure of the test chamber and in order to be able to perform the evaluation on the basis of the differential pressure measurement, the chamber is connected with a reference pressure system prior to evaluation. Then the reference pressure system is disconnected from the chamber and its pressure is the reference pressure for subsequent evaluation of the chamber pressure.

Because the reference pressure system is first joined to the chamber, the pressure which adjusts within it is the same as the pressure in the test chamber. If the reference pressure system is then disconnected from the chamber, the pressure value then prevailing in the test chamber is stored in the reference pressure system and is used in the subsequent evaluation procedure as the reference pressure for a differential pressure measurement.

Furthermore, by carrying out the evaluation of the chamber pressure at a particular point in time, the process of the evaluation becomes extremely simple. At a given point in time a check is carried out to ascertain whether the ACTUAL chamber pressure corresponds to the DESIRED chamber pressure which has been selected in advance, for example, for tight hollow bodies. If the ACTUAL test pressure chamber is compared at two or more points in time, or event continuously in time, with DESIRED pressure values for two or more points in time or with a DESIRED pressure-time curve, then especially in the case of very small leaks the resolving power of the evaluation process is increased, for example, by integrating the comparative result or the DESIRED-ACTUAL difference.

Furthermore, pre-selected DESIRED pressure values or DESIRED pressure curves should preferentially be stored and, when carrying out the test mentioned above, they should be compared as comparative values with the recorded ACTUAL values in order to determine whether a hollow body should, for example, be rejected because of excessive leakage or because it has excessively stiff or excessively elastic wall sections.

In accordance with advantageous features of the apparatus of the present invention, at least one tightly sealable test chamber is provided for receiving at least on hollow body, with regulatable pressure-generating devices applying pressure to the test chamber. Pressure-recording devices ar connectable to the test chamber and have at least one output for a signal which is dependent upon a test chamber pressure.

Advantageously, the pressure generating elements are used as control elements, and pressure recording elements are used to measure the control variable in a test chamber pressure control circuit. Flow meters are provided between the pressure-generating elements and the test chamber to record the amount of pressure medium ($\Delta V/\Delta t$) supplied to or removed from the test chamber as the controlled variable.

In accordance with further features of the present invention, the pressure generating elements are linked through at least one first shut-off member with a prechamber, with the prechamber being, in turn, connected through at least one second shut-off member with the test chamber.

In accordance with the present invention, the pressure-recording elements comprise at least one differential pressure sensor having one input directly linked with the test chamber and a second input connected with the test chamber by way of a reference chamber which is closable by way of a shut-off device.

In accordance with still further features of the present invention, a control unit is provided by which the shut-off device is closed once a given pressure is reached in the test chamber in order to store a reference pressure at the differential pressure sensor and by means of which also the output of the differential pressure sensor is open for evaluation purposes.

In accordance with further features of the present invention, storage means are provided for data corresponding to at least one DESIRED pressure or at least one DESIRED PRESSURE CURVE, with the pressure recording element and the storage means being connected to a comparator arrangement in order to compare the behavior of the pressure in the test chamber in the case of a test object with a DESIRED behavior.

The method and apparatus of the present invention is extremely advantageously used for flexible hollow bodies such as coffee packages and may also be applied to at least partially filled hollow bodies.

BRIEF DESCRIPTION OF THE DRAWINGS

The invention will now be explained in connection with the accompanying drawings which show, for the purpose of illustration only, several examples in accordance with the present invention.

DETAILED DESCRIPTION

Figure 1:
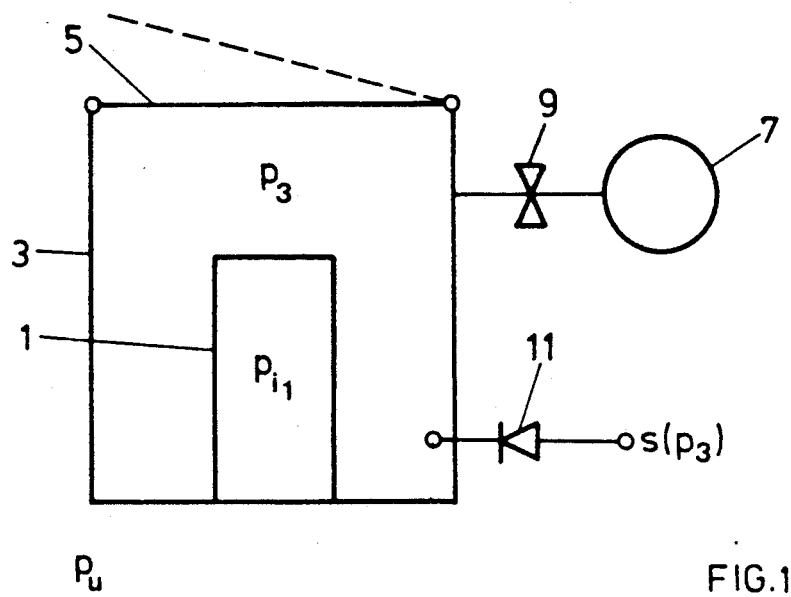
FIG. 1 is a functional block diagram of the fundamental structure of an apparatus according to the present invention and operating according to the method of the present invention.

FIG. 1 is an initial method according to the present invention or an apparatus for implementing the method. A hollow body is to be tested for tightness such as, for example, leaks, or to determine whether its volume changes as a result of pressure stress and elastic deformation of its walls. The hollow body 1 is placed in a test chamber 3, for example, through an opening which is tightly closable by means of a lid 5. An internal pressure $p_{i1}$, which normally corresponds to the ambient pressure $p_u$ exists in the interior of the hollow body 1. Once the test chamber 3 has been hermetically sealed, it is pressurized by connecting a source of pressure medium 7 to the test chamber 3. The pressure medium used is a gas, preferentially, air as a result, a positive or negative differential pressure is generated inside the test chamber 3, with the reference to the internal pressure $P_{i1}$ inside the hollow chamber 1.

The pressure inside the test chamber 3 is designated $P_3$ in FIG. 1. Then the pressure system, consisting of the test chamber 3 and the hollow body 1 to be tested, is separated from the source of pressure medium 7 by means of, for example, a shut-off valve 9 and allowed to stand by itself. If the hollow body 1 is tight to the gas used and if its walls are so rigid that forces resulting from the pressure difference between $p_3$ and $p_{i1}$ acting on the walls do not bring about any substantial deformations, then using a pressure sensor, which could be a mechanical/electrical converter, for example, a piezoelectric pressure sensor, as shown in diagrammatic form at 11 in FIG. 1, an output signal $s(p_3)$ is recorded qualitatively and depicted in FIG. 2a.

Figure 2A:
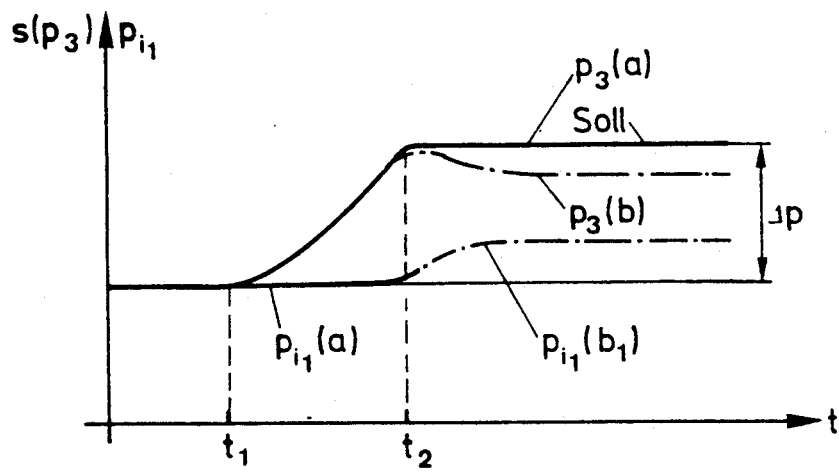
FIG. 2a shows the qualitative plot of the internal pressure in the hollow body and the internal pressure in the test chamber over time, given a differential pressure between the test chamber and the interior of the hollow body which is directed toward the interior of the hollow body and given fully rigid and tight walls of the hollow body on the one hand, and body walls which are tight but yield under the applied pressure stresses.

FIG. 2a presents a qualitative plot over time t of the pressure in the test chamber 3 corresponding to the signal $s(p_3)$, and also of the internal pressure $p_{i1}$ in the hollow body 1. Up to the time $t_1$, for example, until the hollow body 1 is introduced into the test chamber 3 and the latter is tightly closed by means of the cover 5, $p_3$ and $p_{i1}$ are identical to the ambient pressure $p_u$. At time $t_1$, the process of pressurizing the test chamber 3 by means of the pressure medium source 7 commences and the pressure in the chamber 3 rises. In the case mentioned above, in which the hollow body has rigid and tight walls, the internal pressure $p_{i1}$ remains unaffected by the change in pressure in the test chamber 3. At time $t_2$, the source 7 is separated from the test chamber 3 and in the present case the test chamber pressure $p_3(a)$ remains at least approximately constant as does the internal pressure $p_{i1}(a)$ the hollow body 1.

If the walls of the hollow body 1 are not absolutely rigid in the above-mentioned sense but undergo deflection inwards or outwards at least at certain points and in accordance with the applied pressure difference $\Delta p$, which may be positive or negative, then when the differential pressure is directed towards the interior of the hollow body, the qualitative curves $p_3(b)$ or $p_{i1}(b)$ indicated by the dash-dot lines are obtained. Similar circumstances prevail when the differential pressure is directed towards the test chamber 3.

As can be seen from these qualitative curves, after a shorter or longer period of time, both pressures tend asymptotically towards a different constant limit value.

Figure 2B:
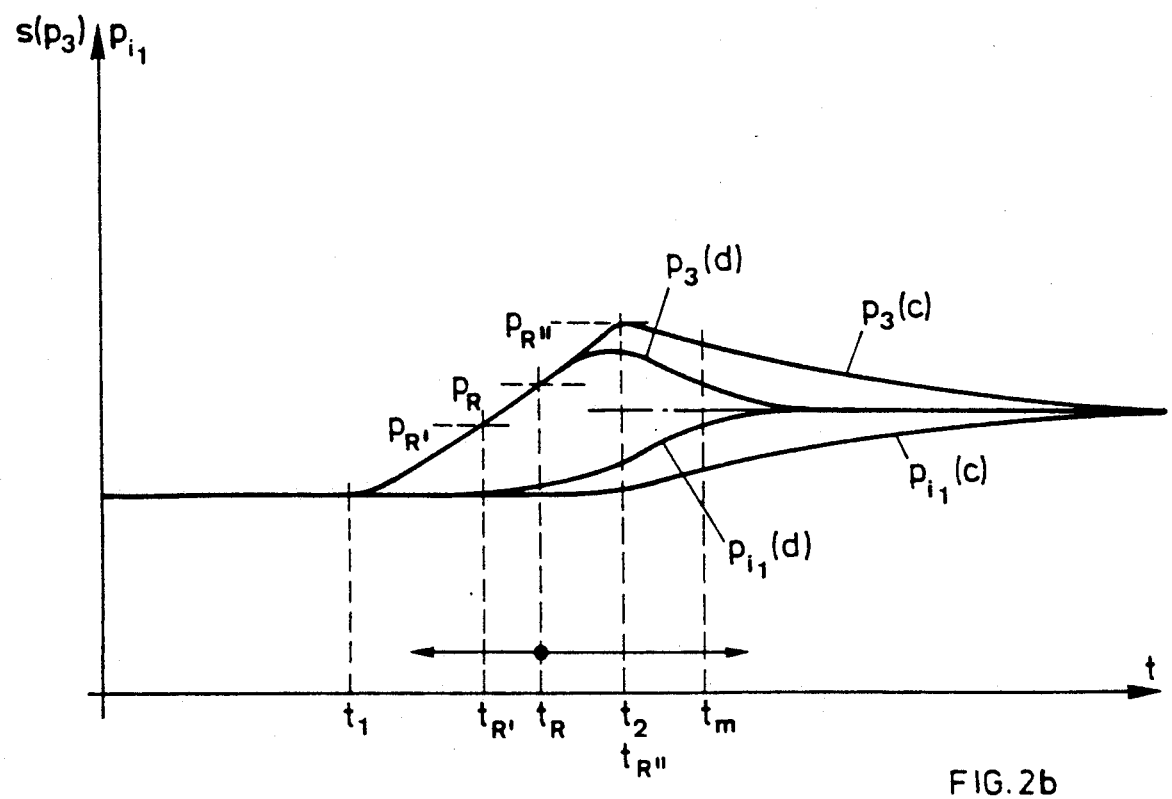
FIG. 2b is a qualitative plot according to FIG. 2a given different leakage rates of the hollow body.

FIG. 2b is a plot, similar to that shown in FIG. 2a, of the conditions prevailing when leaks of various size exist in the hollow body 1. Given a relatively small leak rate, the internal pressure of the hollow body 1 and the pressure between the test chamber 3 and the hollow body 1 equalize at a relatively slow rate in accordance with the qualitative curves p(c), while for larger leaks the equalization takes place at an increasingly fast rate, as shown, for example, by the curves p(d). If a DESIRED curve $p_3$, for example, as shown by $p_3(b)$, is known to apply in general to intact, tight hollow bodies 1, taking account also of any change in volume in the hollow body 1 caused by the differential pressure stress, then at the output side of the sensor 11 it is possible to judge, by comparing the ACTUAL curve with such DESIRED curve, to what extent a tested hollow body is tight or not, or whether it should be rejected or not.

Figure 3:
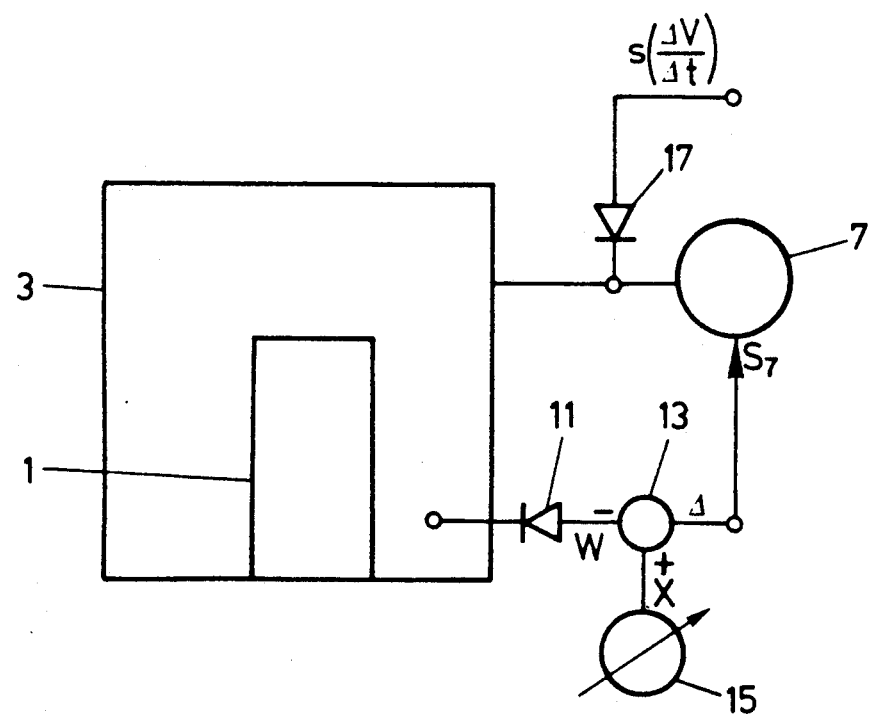
FIG. 3 shows, on the basis of the depiction in FIG. 1, a first embodiment of the invention in which the test chamber pressure is held constant and the controlled variable is evaluated.

For this purpose, in accordance with FIG. 1, the pressure $p_3$ is measured, for example, with reference to the ambient atmosphere having pressure $p_u$ and, advantageously and as will be described further below, the difference between pressure $p_3$ and a given reference pressure is measured. As shown in FIG. 3, the pressure in the test chamber 3 is held constant and the amount of pressure medium or gas added to or removed from the test chamber per unit of time, or integrated over a given period of time, is recorded as the measured variable.

As shown in FIG. 3, after the hollow body 1 to be tested is introduced into the test chamber 3, which is then tightly closed, the chamber is pressurized by means of a source of pressure medium 7, which may be air, or in turn the chamber may be evacuated, and the internal pressure of the test chamber 3 is recorded as the controlled variable W using a pressure sensor 11. The controlled variable W is compared at a differential measuring unit 13 with the reference pressure X or with a signal corresponding to the reference pressure and the resulting control difference $\Delta$ is applied to the control input $S_7$ of the source 7. Using the latter as the regulating element, the pressure in the test chamber 3 is adjusted to the DESIRED value X which has bee set at a preselector device 15. The volume of medium per unit time to be supplied by the source 7, which is the regulating element for test chamber 3, is measured by a flow sensor 17 as a signal $s(\Delta V/\Delta t)$ which is then integrated for further evaluation, for example, over a given period of time.

The curves obtained for the signal $s(\Delta V/\Delta t)$ are analogous to those shown in FIGS. 2a and 2b.

Figure 4:
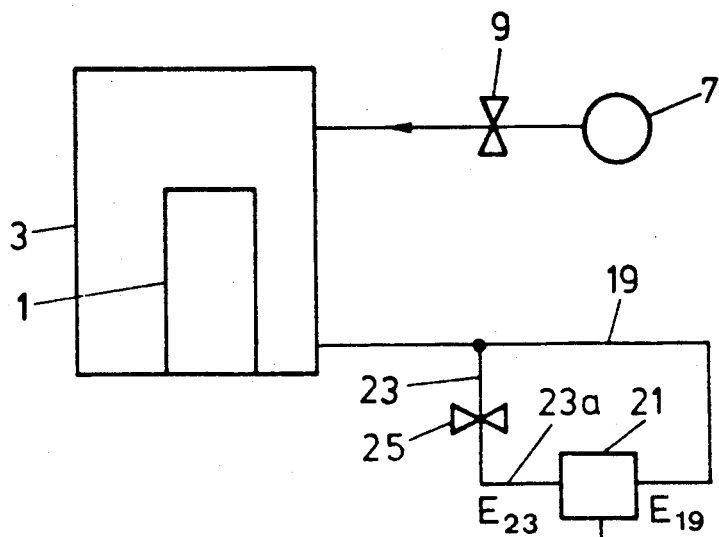
FIG. 4 shows, on the basis of the depiction in FIG. 1, a preferred embodiment of the pressure-recording system in which the pressure is measured as differential pressure.

FIG. 4 shows a preferred embodiment of the method of measuring the pressure in the test chamber 3 as depicted in FIG. 1. During the pressure build-up phase between times $t_1$ and $t_2$, the test chamber is connected via a line 19 with one input $E_{19}$ of a differential pressure sensor 21, for example, a piezo-electric sensor. Via a second line 23 fitted with a shut-off valve 25, the test chamber 3 is further connected with a second input $E_{23}$ of the differential pressure sensor 21. At time $t_R$ as shown in FIG. 2b, the shut-off valve 25 is closed so that the pressure prevailing at that time in the test chamber 3 remains built-up in the section of line 23a between shut-off valve 25 and input $E_{23}$ which is used as the reference pressure system. This pressure in the connecting line 23a acts as the reference pressure on the differential pressure sensor 21 since the line 19 remains open in the following measurement phase for $t > t_2$, a differential pressure is measured at the differential pressure sensor 21 relative to the pressure prevailing in the test chamber at the time $t_R$. As can be seen from FIG. 2b, the time $t_R$ is adjusted on a case by case basis to give optimum measurement resolution, as indicated by $t_{R'}$, $t_{R''}$ and resulting reference pressures $p_R$, $p_{R'}$, and $p_{R''}$.

Figure 5:
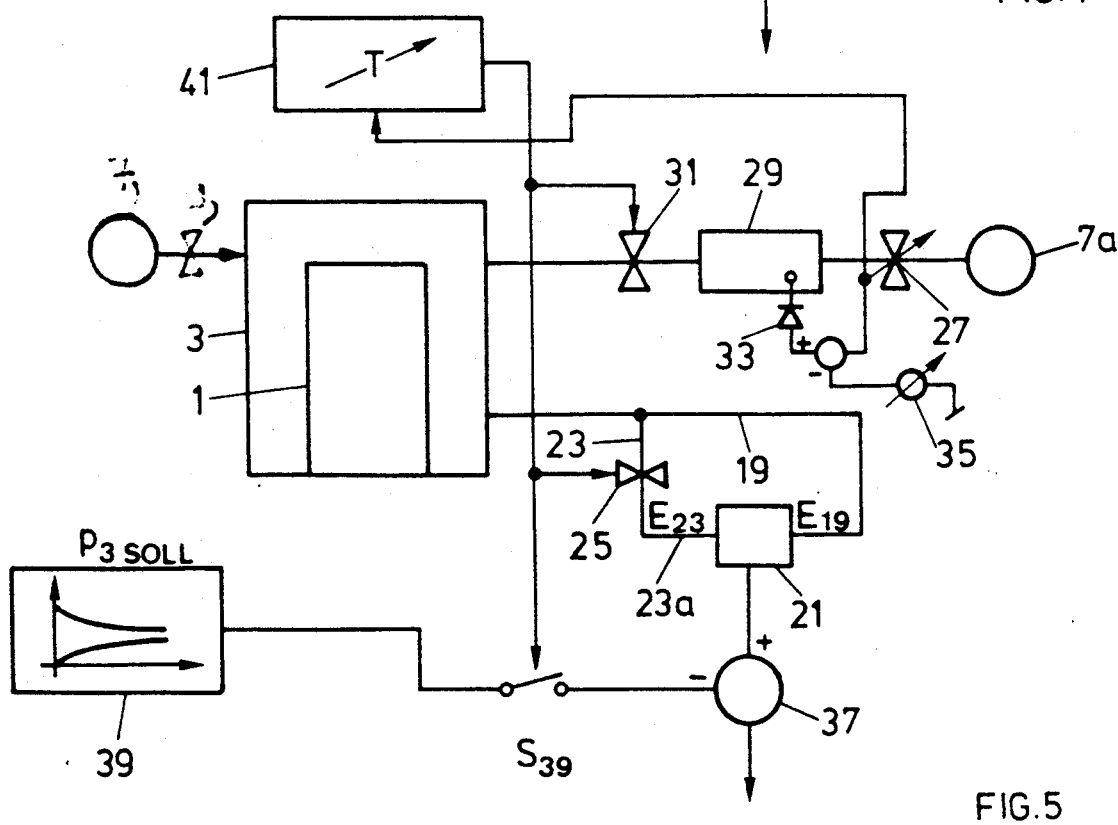
FIG. 5 shows, on the basis of the depiction in FIG. 1 or FIG. 4, a preferred embodiment of the apparatus for applying pressure to the test chamber as well as a time control apparatus for controlling the time of the individual phases of the method.

Proceeding from the diagram in FIG. 4, FIG. 5 presents a preferred embodiment of the means of pressurizing the test chamber 3. For this purpose, a test gas source such as a pump 7a, is connected via a shut-off valve 27 with a reference volume in a reference chamber 29. The latter is connected via a further shut-off valve 31 with the test chamber 3. Using source 7a and with valve 27 initially open and valve 31 shut, the reference chamber 29 is filled with a test gas and a pressure sensor 33 is used to measure the pressure in the reference chamber. Once the pressure measured by the sensor 33 attains the reference pressure adjusted at a reference signal source 35, the valve 27 is closed. Next, valve 31 is opened, thus forming a communicating system between chambers 3 and 29 and the test gas pressure is equalized according to the volumes in chambers 29 and 3. Following an equalization phase corresponding to the time section $t_2$, $t_1$ in FIG. 2b, the course of the differential pressure is measured using the differential pressure sensor 21 as described on the basis of FIG. 4, or at a given measuring time $t_m$ any differences between a DESIRED differential pressure and an ACTUAL differential pressure are recorded as shown in FIG. 2b.

As further shown in FIG. 5, the output of the differential pressure sensor 21 is fed, for example, to a comparator 37 to which, at a second input, a standard curve is supplied from a storage and output device 3, for example, a computer. The deviations of the instantaneous test result from a given DESIRED result can be delivered at any point in time at the output of the differentiator 37 and, on the basis of these deviations a decision can be made regarding the condition of the hollow body 1 that is being tested. Instead of comparing the time curves, it is also possible at any given point in time corresponding to $t_m$ to compare the ACTUAL pressure difference at the output of the differential pressure sensor 21 with DESIRED values stored in the unit 39. For this purpose, a timer unit, as shown in diagramatic form 41, is provided. When the given pressure is attained in the reference chamber 29, the timer is activated and, in accordance with preselected time intervals T, it operates the valves 31, 25 and can also set the DESIRED value at $S_{39}$.

According to this procedure, and using the arrangement described, it is possible to detect leaks reliably and rapidly over an extremely broad range. Similarily, as was explained on the basis of FIG. 2a, it is possible to detect deviations in the shape characteristics of the hollow bodies from the anticipated shape characteristics, as may happen, for example, if the wall sections are unacceptably rigid or unacceptably elastic.

I claim:

1. A process for at least one of testing tightness of a hollow body and change in a volume of the hollow body caused by pressure stress applied to walls of the hollow body, the method comprising the steps of:
   placing said hollow body in a test chamber;
   exposing said hollow body to one of a positive or negative differential pressure between an internal pressure of the hollow body and a pressure in the test chamber;
   connecting the test chamber to two differential inputs of a differential pressure sensor;
   interrupting the connection to one of the differential inputs at a predetermined position of a connecting line of one of said inputs to said test chamber thereby selecting said position so that a volume of a section of said connecting line between said position and said one input is considerably less than the volume of said test chamber and forming a reference pressure system by said section of said connecting line to hold pressure at said one input at a level assumed at the moment of interrupting;
   monitoring a behavior of a pressure at the other of said two differential inputs with respect to the pressure at said one input; and
   determining at least one of the tightness and change in volume of the hollow body from an output signal of said differential pressure sensor.

2. A process according to claim 1, wherein the pressure at said other of said two differential inputs is held constant by a negative feedback pressure control and evaluating an adjusted controlled variable.

3. A process according to claim 2, wherein an amount of a pressure medium supplied to or removed from the test chamber per unit of time is evaluated as said controlled variable to hold said pressure at the other of said two differential inputs constant.

4. A process according to claim 1, further comprising the steps of providing a second chamber, loading said second chamber to a given pressure, and connecting said second chamber to the test chamber to generate the pressure differential.

5. The process according to claim 4, wherein the test chamber is initially provided with a positive or negative pressure.

6. The process according to claim 1, further comprising the step of evaluating said output signal at least at one given point in time after the step of interrupting said connection or evaluating a course of said output signal continuously over a predetermined period of time.

7. The process according to claim 1, further comprising the step of comparing said output signal with a predetermined value and concluding a lack of tightness of the hollow body as a result of the comparison.

8. An apparatus for at least one of testing tightness of a hollow body and detecting a change in a volume of the hollow body and detecting a change in a volume of the hollow body caused by pressure stresses applied to walls of the hollow body, the apparatus comprising:
   at least one tightly closable test chamber for accommodating said hollow body;
   pressure generating means for applying one of positive or negative pressure to said test chamber; and
   differential pressure sensor means provided with two differential inputs both connected to said test chamber, one of said inputs being connected to said test chamber by a shut-off valve means, wherein a section of a line from one of said inputs to said shut-off valve means is unbranched for enabling a testing and has a volume considerably less than a volume of said test chamber.

9. An apparatus according to claim 8, wherein an output of said differential pressure sensor is connected to an input of a difference forming unit, a reference signal source is connected to a second input of said difference forming unit, an output of said difference forming unit is adapted to control an adjustment of said pressure generating means so as to provide a negative feedback control of said pressure generated by said pressure generating means within said test chamber on a value output from said reference signal source.

10. The apparatus according to claim 8, further comprising a shut-off valve for connecting said test chamber to a prechamber, and wherein a further shut-off valve is provided for connecting said prechamber with said pressure generating means.

11. The apparatus according to claim 8, further comprising a control means for outputting a shut control signal for said valve connected between one of said inputs of said differential pressure sensor once a preselected pressure value is reached within said test chamber so as to store said predetermined pressure value at said one input of said differential pressure sensor as a reference pressure value.

12. The apparatus according to claim 8, wherein an output of said differential pressure sensor is connected to one input of a difference forming unit, and wherein a reference signal source is connected to a second input of said difference forming unit.

13. An apparatus according to claim 12, wherein said reference signal source is adapted to output a reference signal varying in time.

14. A method of leak testing a hollow body, the method comprising the steps of:
   placing said hollow body in a test chamber;
   introducing a pressure medium to said test chamber so as to apply a pressure to said hollow body different from an internal pressure of said hollow body;
   connecting said test chamber to a differential pressure sensor by first and second inputs;
   closing a valve connecting said test chamber to said first input of said differential pressure sensor to provide a reference pressure value for said differential pressure sensor;
   detecting the pressure of said test chamber over time at said second input of said differential pressure sensor;
   comparing said reference pressure value and said detected pressure to provide information on the tightness of the hollow body; and
   wherein the pressure in said test chamber is held constant over a given time period by introducing further pressure medium or releasing pressure medium from said test chamber, and wherein the amount of pressure medium introduced to or removed from the test chamber over said given time period is evaluated to provide said information on the tightness of the hollow body.

15. A method of leak testing a hollow body, the method comprising the steps of:
   placing said hollow body in a test chamber;
   introducing a pressure medium to said test chamber so as to apply a pressure to said hollow body different from an internal pressure of said hollow body;
   connecting said test chamber to a differential pressure sensor by first and second inputs;

closing a valve connecting said test chamber to said first input of said differential pressure sensor to provide a reference pressure value for said differential pressure sensor;

detecting the pressure of said test chamber over time at said second input of said differential pressure sensor;

providing a reference chamber which is connected with the test chamber through a shut-off valve;

introducing pressure medium to said reference chamber to provide a predetermined pressure in said reference chamber with said valve closed;

opening said valve;

allowing pressure to equalize between the reference chamber and said test chamber to make-up the pressure initially applied to said hollow body; and comparing said reference pressure value and said detected pressure to provide information on the tightness of the hollow body.

16. An apparatus for leak testing of a hollow body, the apparatus comprising:

at least one tightly closable test chamber adapted to hold at least one hollow body;

a pressure medium source for introducing pressure medium to said test chamber, said pressure medium source acting to maintain the pressure in said test chamber at a constant level over a given time period;

means for establishing a reference pressure value at a point in time when testing of the hollow body begins;

means for detecting pressure values in said test chamber over a given period of time;

means to record the amount of pressure medium supplied to or removed from a test chamber over said given period of time in order to maintain the pressure of the test chamber; and means for comparing said reference pressure value and said detected pressure values to obtain information about the tightness of the hollow body.

17. Apparatus according to claim 16, wherein said means to record comprise flow meters.

18. An apparatus for leak testing of a hollow body, the apparatus comprising:

at least one tightly closable test chamber adapted to hold at least one hollow body;

a pressure medium source for introducing pressure medium to said test chamber;

means for establishing a reference pressure value at a point in time when testing of the hollow body begins;

means for detecting pressure values in said test chamber over a given period of time;

a reference chamber connected between said test chamber and said pressure medium source including shut-off valves between each of said test chamber and said pressure medium source; and means for comparing said reference pressure value and said detected pressure values to obtain information about the tightness of the hollow body.

19. An apparatus for leak testing of a hollow body, the apparatus comprising:

at least one tightly closable test chamber adapted to hold at least one hollow body;

a pressure medium source for introducing pressure medium to said test chamber;

means for establishing a reference pressure value at a point in time when testing of the hollow body begins;

means for detecting pressure values in said test chamber over a given period of time; and means for comparing said reference pressure value and said detected pressure values to obtain information about the tightness of the hollow body, and wherein said means for comparing comprise a differential pressure sensor, said means for establishing a reference pressure value connecting said test chamber and said differential pressure sensor via a shut-off valve, and said means for detecting pressure values directly connect said test chamber and said differential pressure sensor.

* * * * *